United States Patent [19]

Parus

[11] Patent Number: 5,684,496
[45] Date of Patent: Nov. 4, 1997

[54] DEVICE FOR SUBSTITUTING AN ARTIFICIAL IMAGE SHOWN TO AN AIRCRAFT PILOT BY THE CORRESPONDING REAL IMAGE

[75] Inventor: Roger Parus, St Remy les Chevreuse, France

[73] Assignee: Sextant Avionique, Meudon La Foret, France

[21] Appl. No.: 432,069

[22] Filed: May 1, 1995

[30] Foreign Application Priority Data

May 10, 1994 [FR] France ................... 94 05730

[51] Int. Cl.$^6$ ................... G09G 5/00; H04N 7/18
[52] U.S. Cl. ................... 345/7; 345/8; 345/9; 340/972; 340/979; 340/980; 364/424.06; 364/439; 348/115; 348/121
[58] Field of Search ................... 345/7–9; 340/972, 340/971, 979, 980; 364/424.06, 441, 439; 348/113, 115, 117, 121–124

[56] References Cited

U.S. PATENT DOCUMENTS

| | | | |
|---|---|---|---|
| 4,554,545 | 11/1985 | Lowe | 340/980 |
| 4,868,652 | 9/1989 | Nutton. | |
| 5,150,117 | 9/1992 | Hamilton et al. | 340/973 |
| 5,241,391 | 8/1993 | Dodds | 358/209 |
| 5,302,964 | 4/1994 | Lewins | 345/7 |

OTHER PUBLICATIONS

Displays, vol. 12, No.3/4, Guildford GB pp. 129–140, XP264722 Ineson "Imagery for a Virtual Cockpit" Jul., 1991.

IEEE National Aerospace and Electronics Conference, New–York U.S. pp. 770–775 Richardson "A Fortran Algorithm for Terrain Perspective and Plan View Display" May, 1985.

*Primary Examiner*—Donnie L. Crosland
*Attorney, Agent, or Firm*—Oblon, Spivak, McClelland, Maier & Neustadt, P.C.

[57] ABSTRACT

A device for the substitution of an artificial image shown to an aircraft pilot by the corresponding real image includes a device for the simulation of human vision; criteria for the exploitation of the simulated image; compare to a device for comparing to compare the simulated image with the criteria of exploitation; a device for attenuating the artificial image, the artificial image being attenuated when the simulated image meets a given number of exploitation criteria.

16 Claims, 5 Drawing Sheets

DEVICE FOR SUBSTITUTING AN ARTIFICIAL IMAGE SHOWN TO AN AIRCRAFT PILOT BY THE CORRESPONDING REAL IMAGE

BACKGROUND OF THE INVENTION

1. Field of the Invention

The present invention relates to a device for the substitution of an artificial image shown to an aircraft pilot by the corresponding real image. It can be applied notably to the securing of the landing phases of an aircraft by the optimizing of the transition between the direct view of a scene and an image of this same scene which may be a synthetic image or an image coming from imaging sensors and shown superimposed on the pilot's direct view.

2. Description of the Prior Art

In the so-called EVS or enhanced vision system used for the piloting of aircraft, the artificial image shown superimposed on the real image is designed to supplement direct vision when the latter is insufficient, notably in fog. It is presented superimposed on the scene and in conformity with it by means of a head-up collimator. The set formed by the artificial image and the scene is therefore perceived simultaneously without calling for variations, notably of accommodation or vergency of the visual system.

The imaging sensors are, for example, chosen in such a way that their image is less affected notably by fog and weather conditions than is direct vision.

For reasons of safety, it is desirable that the pilot should be capable of acquiring the direct view of the external scene as soon as the quality of the direct image enables it. Now, the artificial image, since it is presented with extra brightness on the scene, hampers direct viewing.

There are known ways of eliminating this direct image. In certain cases, a manual command for extinguishing the artificial image, available to the pilot, is used to deactivate this image. The pilot may take his decision as a function of what he sees, especially in the part of the field of direct vision that is not covered by the artificial image. For certain types of approach, there is a decision height. During descent, when this height is being crossed, the pilot must see the runway to decide whether to continue or interrupt the approach. The pilot may decide to extinguish the artificial image at this instant of operation to ascertain that he has a clear view of the runway and to continue the landing phase.

The known means of extinguishing artificial images show several drawbacks. Indeed, they cannot be used to determine the most appropriate instant for extinguishing the artificial image. The delayed and total elimination of the artificial image at the instant of decision does not leave the pilot with sufficient time to make use of the direct image that is thus unmasked. On the contrary, a total elimination of the artificial image that is more premature entails the risk of depriving the pilot of information that is contained in the artificial image and that direct viewing cannot provide as yet.

The aim of the invention is to overcome the abovementioned drawbacks notably to enable direct viewing to replace the artificial image at the instant most favorable for piloting safety.

SUMMARY OF THE INVENTION

To this end, an object of the invention is a device for the substitution of an artificial image shown to an aircraft pilot by the corresponding real image, wherein said device comprises at least:

means for the simulation of human vision;

criteria for the exploitation of the simulated image;

means to compare the simulated image with the criteria of exploitation;

means to attenuate the artificial image, the artificial image being attenuated when the simulated image meets a given number of exploitation criteria.

The main advantages of the invention are that it can be applied to all types of aircraft and all stages of flight, can be adapted to all types of weather, is simple to implement and is economical.

BRIEF DESCRIPTION OF THE DRAWINGS

Other features and advantages of the invention shall appear from the following description, made with reference to the appended drawings, of which.

MORE DETAILED DESCRIPTION

Figure 1:
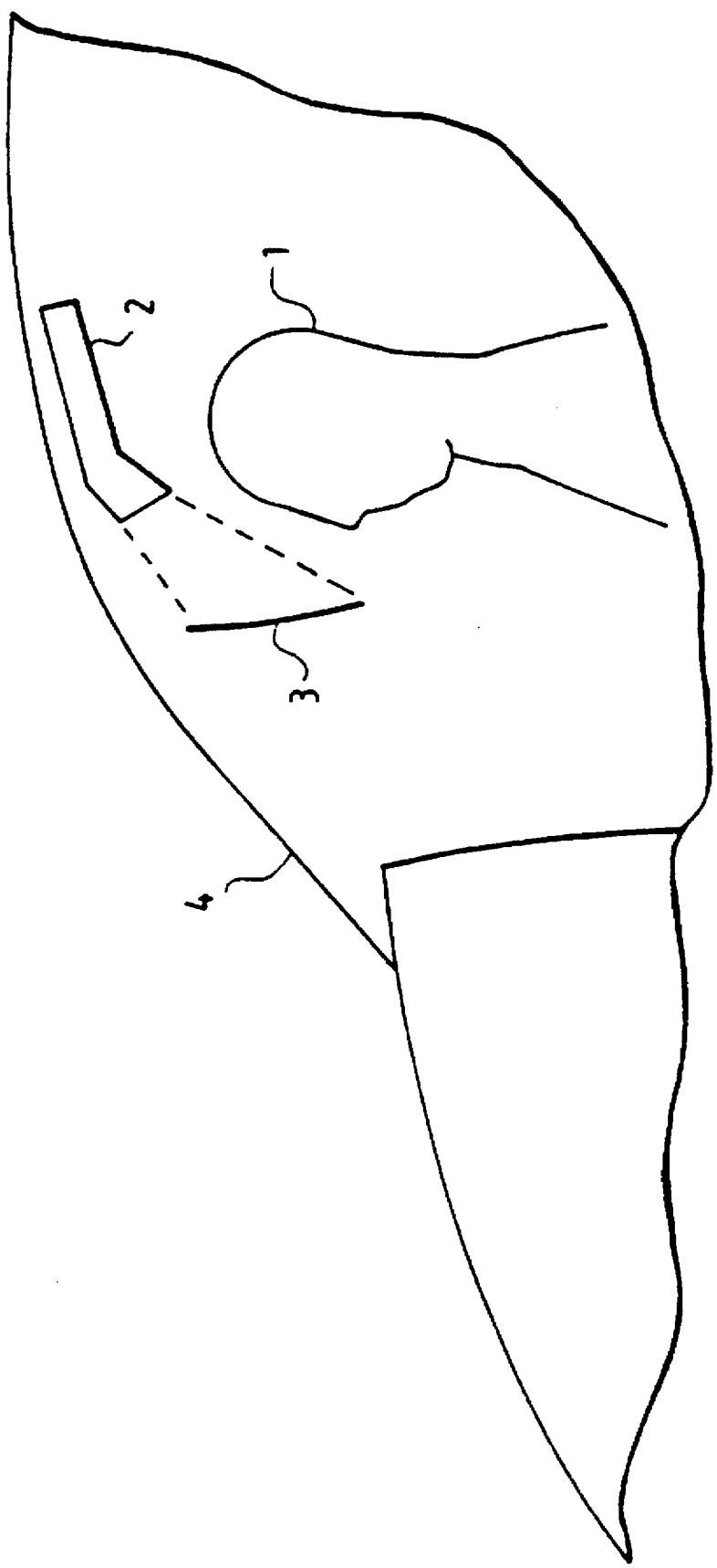
FIG. 1 shows a pilot having an artificial image available to him.

FIG. 1 shows a pilot in an aircraft cockpit. In a landing phase for example, a collimator 2 sends him an artificial image on a glass panel 3 located in his field of vision. The artificial image is superimposed on the real image of the external world received by the pilot. In the event of poor visibility, the artificial image reproduces the scene that cannot be directly viewed by the pilot by means of imaging sensors such as infrared sensors or millimetrical wave radars for example. As soon as the external world becomes directly visible, to a sufficient extent, to the pilot through the glass surface 4 of the cockpit, the collimated artificial image no longer needs to be maintained. It may be even become troublesome for the pilot, notably because of its extra brightness. It is therefore deactivated.

Figure 2:
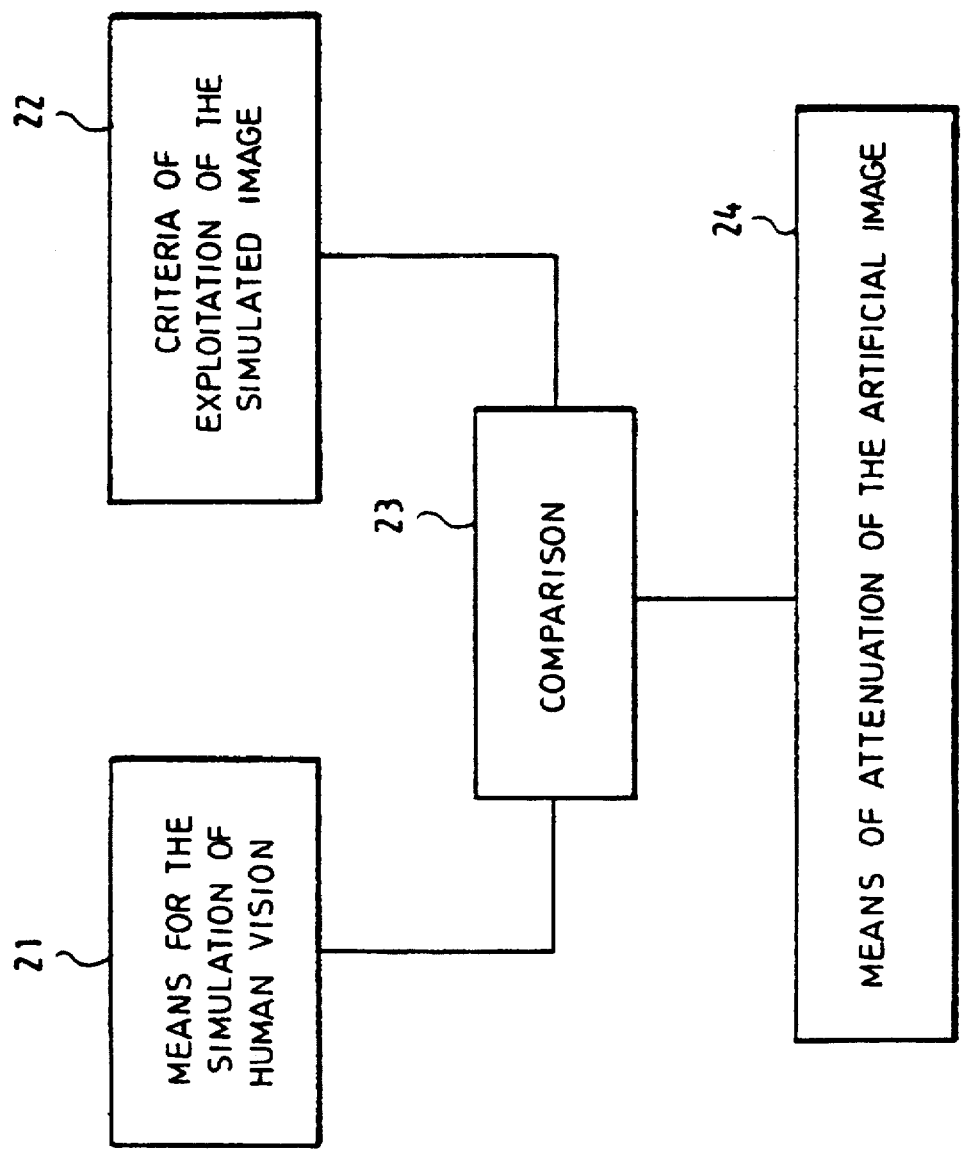
FIG. 2 shows a block diagram of a possible embodiment of a device according to the invention.

FIG. 2 shows a block diagram of a possible embodiment of a device according to the invention enabling the deactivation of the artificial image at the instant most favorable to piloting safety, the real image of the external world then replacing the artificial image that reproduces this very same external world.

The device according to the invention comprises means 21 for simulating human vision. These means are, for example, constituted by a television camera covering approximately the same spectral band as the human eye. The usual cameras, whose photosensitive element is silicon, have a spectral band extending further towards the near infrared than the human eye. The image obtained may be adjusted, for example by an optical filter, to cover the spectral band corresponding to the human eye.

The device according to the invention further comprises criteria 22 for the exploitation of the simulated image. These means 22 are linked with human vision simulation means 21 to means 23 for the comparison of the simulated image with the exploitation criteria 22. Means 24 for the attenuation of the artificial image, produced for example by a head-up collimator, are connected to the comparison means 23 so that the artificial image is attenuated or even concealed when the simulated image meets a given number of exploitation criteria. The criteria and comparison thresholds are notably defined so that the real image of the direct vision replaces the artificial image at the precise moment when it contains sufficient information to be exploited in full safety by the pilot.

Since the simulated image is considered to be equivalent to the real image seen directly by the pilot, it is possible to define one or more criteria of exploitation and memorize them for example. The criteria may, for example, be constituted by image quality indicators.

The quality indicators used notably represent the quality of perception of the useful objects contained in the image. These useful objects are, for example, bright points corresponding to a runway beacon lighting, paint marks, boundaries between concrete and grass, etc.

The obtaining of the indicators is done with image processing and extraction techniques in a manner known to those skilled in the art. For example, the indicators may be as follows.

A first indicator may be that of mean luminance. A limit value Lo of the mean luminance defines the choice of the exploitation criteria (daytime or night-time images for example).

A second indicator may be that of image contrast. This is defined for example as follows. Let N1 pixels be the brightest pixels of the image, N1 being an integer. Let Lmax be the luminance of the least bright of the N1 brightest pixels of the image. Let N2 be another fixed integer. Let Lmin be the brightest luminance of the N2 least bright pixels. This second indicator may be defined by the ratioL max L min/L min.

A third indicator may be that of contrast gradient. Let N3 be a fixed integer, L being the luminance of the current pixel of the image. The N3 highest values of the gradient of the luminance $|\overrightarrow{gradL}|$ are memorized. This third indicator is formed by the lowest of these N3 values referenced $|\overrightarrow{gradL}|$ min.

A fourth indicator may be obtained from the second indicator mentioned here above by adapting it to sets of N4 contiguous pixels instead of isolated pixels, N4 being an integer.

Finally, a fifth indicator may be obtained from the above-mentioned third indicator by adapting it to sets of N5 stringed pixels, N5 being an integer.

For each of these indicators, a boundary value defines for example a comparison threshold on the basis of which the associated criterion of exploitation is supposed to be met. These boundary values are, for example, memorized in an on-board data base. In this case, the comparison means 23 compare the values of these indicators, taken in the simulated image, totally or partly, with a set of limit values defining an acceptable image quality.

To define and notably memorize these limits as well as to use them at the right time, it is necessary to have prior knowledge of the pixels that the simulated image is liable to present. These pixels may effectively be known on an a priori basis as a function of the flight parameters enabling the approximate computation of the position of the aircraft and the approach images that are memorized, notably for the landing procedures.

It is also possible that the comparison means 23 will compare the values of these indicators taken in the simulated image with the values of the same indicators computed on the artificial image. So long as the given number of indicators of the simulated image remains lower in quality than the corresponding indicators of the artificial image, the artificial image is for example kept.

Figure 3:
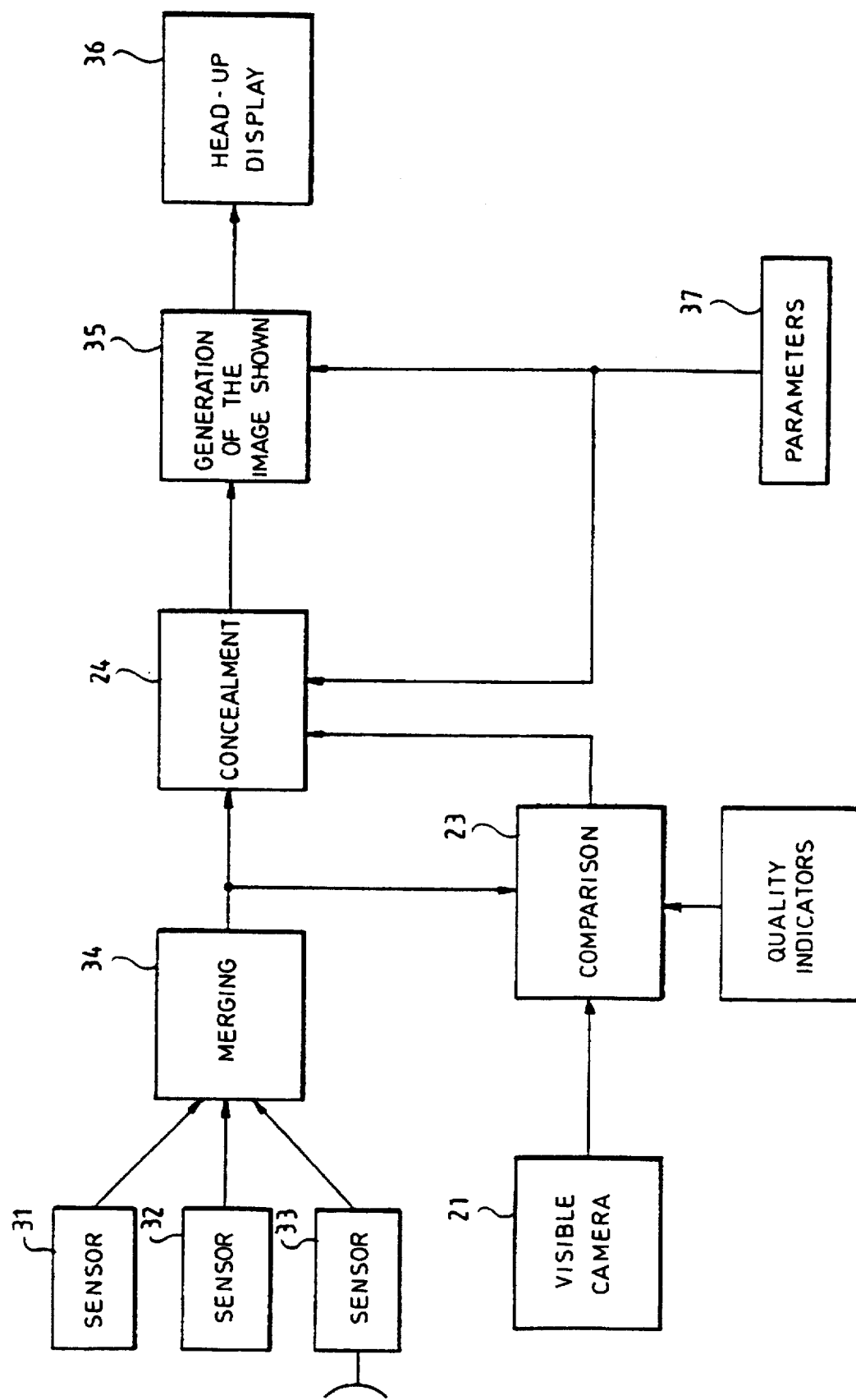
FIG. 3 exemplifies an application of a device according to the invention.

FIG. 3 shows an exemplary application of a device according to the invention in the context, for example, of an EVS system mentioned above used for the landing of aircraft under conditions of poor visibility.

The EVS artificial imaging system comprises, for example, three sensors 31, 32, 33. A first infrared sensor 31 works, for example, in the 3 to 5 μm wavelength band. A second infrared sensor 32 works, for example, in the 8 to 12 μm wavelength band. A third sensor 33 is, for example, formed by a millimetrical wave radar. The images produced by these three sensors 31, 32, 33 are merged by merging means 34. The resultant artificial image is, for example, transmitted to concealment means 24, the attenuation in this case causing the total disappearance of the image.

The human vision simulating means 21, constituted for example by a camera working in the visible spectrum, are connected to comparison means 23 enabling the simulation video image to be compared with the quality indicators 22, for example of the above-mentioned type. As an option, the EVS artificial image obtained at output of the merging means 34 may be delivered to the comparison means notably when the comparison between the quality indicators is done between those of the video image and those of the EVS artificial image.

The artificial image may be a synthetic image obtained from a data base which is an on-board data base for example. The image is synthesized notably as a function of the localization of the aircraft.

The comparison means 23 being connected to the concealment means 24, these means 24 control head-up means 35. This control is a function of the result of the comparison means 23. The image is not shown if this result shows that the quality of the image does not enable its safe use by the pilot.

The generation of the image presented is also controlled, for example, by parameters 37 such as notably the flight parameters of the aircraft, these parameters defining notably its localization.

Thus, when the aircraft is far from an airport, outside a landing phase in particular, the image is not presented to the collimator 36.

The parameters 37 may also activate the concealment 24 of the artificial image so that, if the simulated image still cannot be used when the decision height is crossed, the pilot can himself observe the state of visibility and decide to land or resume altitude in order to postpone the landing. The decision height is a predefined height after which the pilot tests the visibility on the ground elements notably, in order to judge the possibility of landing.

Figure 4:
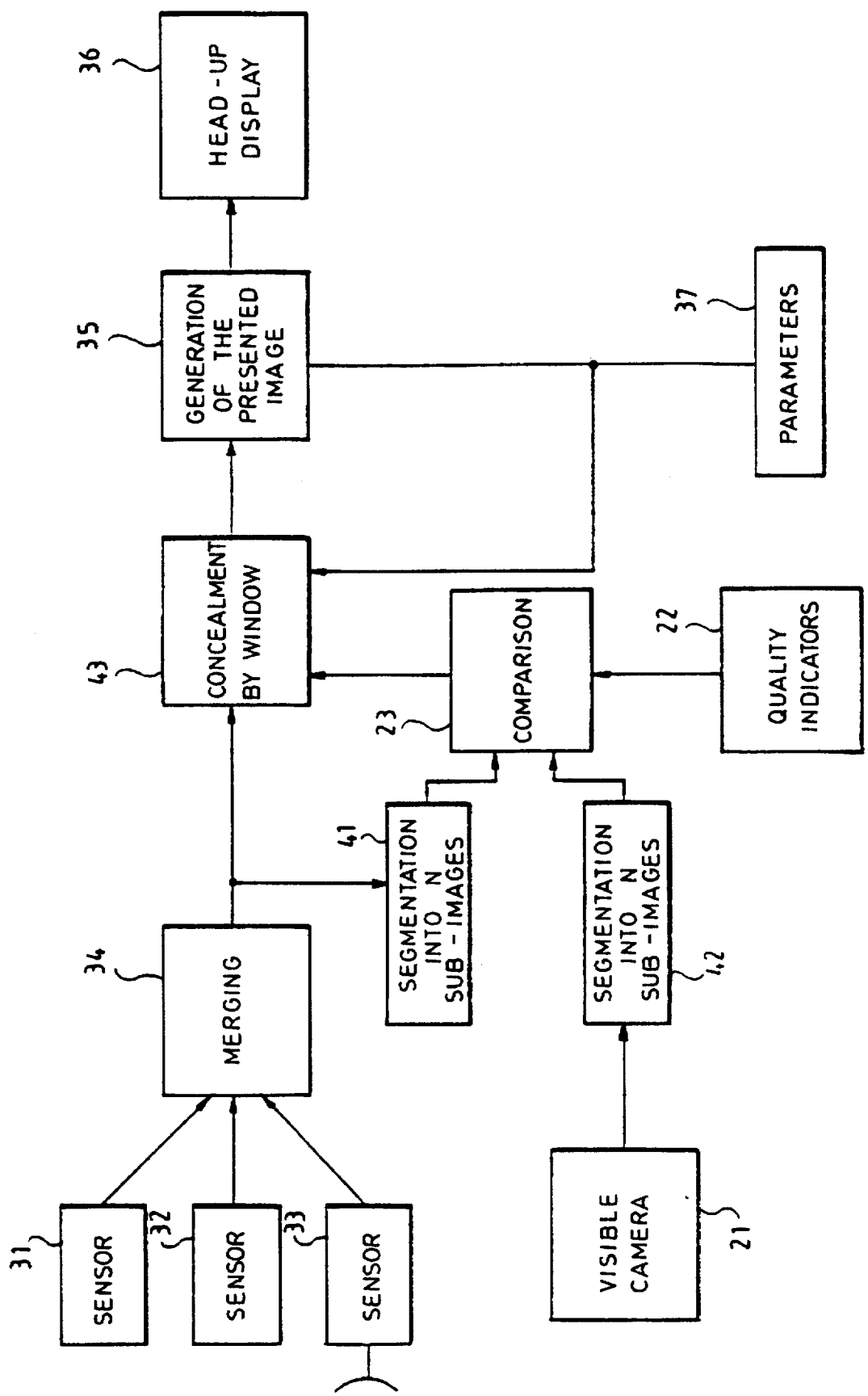
FIGS. 4 and 5 show other possible embodiments of a device according to the invention.

FIG. 4 shows another possible exemplary embodiment of the invention for the application of FIG. 3, notably to take account of the fact that the quality of the image perceived in direct vision is not constant throughout the field of vision. For this purpose, instead of analyzing image quality throughout the field and deducing the total attenuation or concealment therefrom, this embodiment enables an attenuation or concealment by windows by notably partitioning the field into windows, the latter being processed individually.

In this case, the device of FIG. 3 is complemented by means 41 for the segmentation of the artificial image. These means 41 are interposed between the merging means 34 and the comparison means 23. It is also complemented by means 42 for the segmentation of the simulated image interposed between the camera 21 and the comparison means 23. The segmentation of each of these images produces, for example, a given number N of sub-images. The comparison means 23 are connected to window-based concealment or attenuation means 43. The segmentation into sub-images and the concealment by windows are done by standard video processing techniques.

Figure 5:
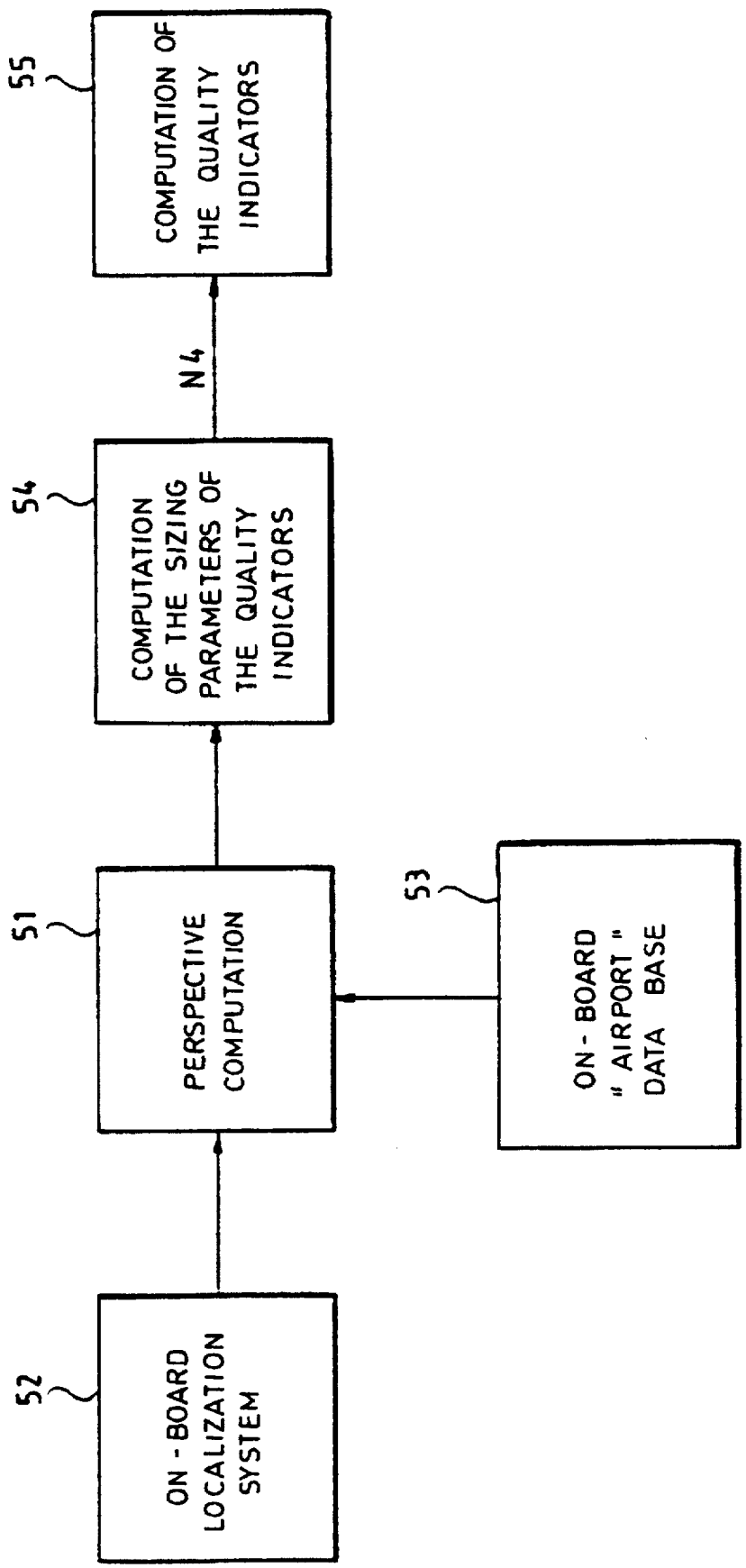

FIG. 5 shows another possible exemplary embodiment of a device according to the invention, notably to take account of the fact that the useful content and scale of the artificial image are a function of the parameters of localization of the aircraft, these parameters being possibly known to the system.

For this purpose, the principle of the device consists in permanently assessing the list and apparent size of the objects that can be exploited in the image and in deducing therefrom the values to be used for the parameters that size the quality indicators, these parameters being, for example, the numbers N1, N2, N3, N4, N5 mentioned here above. For example, in the case of an approach on a runway comprising paint marks of known sizes and positions, the regulations require the pilot to make visual identification of a well-defined set of these marks in order to receive landing permission. In view of the position of the aircraft defined by the on-board localization system, the device makes a computation, at each instant, of the solid angle at which the pilot sees each of these marks. The above-mentioned value N4 may, for example, be chosen so that the equivalent in pixels of the image corresponds to the smallest of the angles thus computed or to a slightly smaller value. Taking a lower solid angle limit in this way avoids the taking into account of parasitic objects.

Perspective computation means 51 are connected to the on-board localization system 52 and to an on-board data base 53 comprising, for example, the characteristics of the approach airport and notably those of the landing runway concerned. The perspective is computed by the definition of the above-mentioned solid angles. For this purpose, the on-board localization system 52 gives the perspective computing means 51 the position of the aircraft with respect to the expected runway and the data base 53 gives it the characteristics of the marks of the runway. The perspective computing means 51 define the apparent size of the marks. This information is transmitted to means 54 for computing the sizing parameters of the quality indicators. These parameters are notably a function of the apparent size of the objects, the runway marks for example. In the example of FIG. 5, the number N4 mentioned here above is obtained and transmitted by these means 54 to means 55 for the computation of the quality indicators 22.

What is claimed is:

1. A device for the substitution of an artificial image shown to an aircraft pilot by a corresponding real image, wherein said device comprises:

means for simulation of human vision which provides a simulated image;

means for establishing a plurality of testing criteria for testing said simulated image;

means for comparing the simulated image with the plurality of established testing criteria;

means for attenuating the artificial image when the simulated image meets a predetermined number of said plurality of testing criteria.

2. A device according to claim 1, wherein the artificial image is totally attenuated.

3. A device according to claim 1, wherein the means for the simulation of human vision are constituted by a video camera.

4. A device according claim 1, wherein the testing criteria are formed by a plurality of image quality indicators, which represent the quality of perception of useful objects contained in the image.

5. A device according to claim 4, wherein one of said quality indicators is a mean luminance of the image.

6. A device according to claim 4, wherein one of said quality indicators is a contract of the image.

7. A device according to claim 4, wherein one of said quality indicators is a gradient of a contrast of the image.

8. A device according to claim 4, wherein boundary values of the quality indicators defining comparison thresholds are memorized in an on-board data base.

9. A device according to claim 4, wherein the means for comparing compares quality indicators taken in the simulated image with those computed on the artificial image, the indicators of the artificial image constituting comparison thresholds.

10. A device according to claim 1, comprising means for segmenting the simulated image into sub-images, said segmenting means being interposed between the simulation means and the comparison means, concealment means carrying out operations to conceal the sub-images independently.

11. A device according to claim 4, further comprising computing means linked to an on board localization system and to a data base comprising at least the characteristics of objects to be displayed by the aircraft, the computing means including means to compute sizing parameters of the quality indicators with an apparent size of the objects, said sizing parameter computation means providing an output to said means for computing the quality indicators.

12. A device according to claim 11, wherein the objects are the marks of a landing runway.

13. A device according to claim 1, comprising means for segmentation of the artificial image, an output of said segmentation means being connected to the means for comparing.

14. A device according to claim 1, wherein the attenuation means are controlled as a function of flight parameters of the aircraft.

15. A device according to claim 14, wherein the artificial image is concealed as a function of landing phase.

16. A device according to claim 1, associated with an EVS or enhanced vision system.

* * * * *